Figure 1:
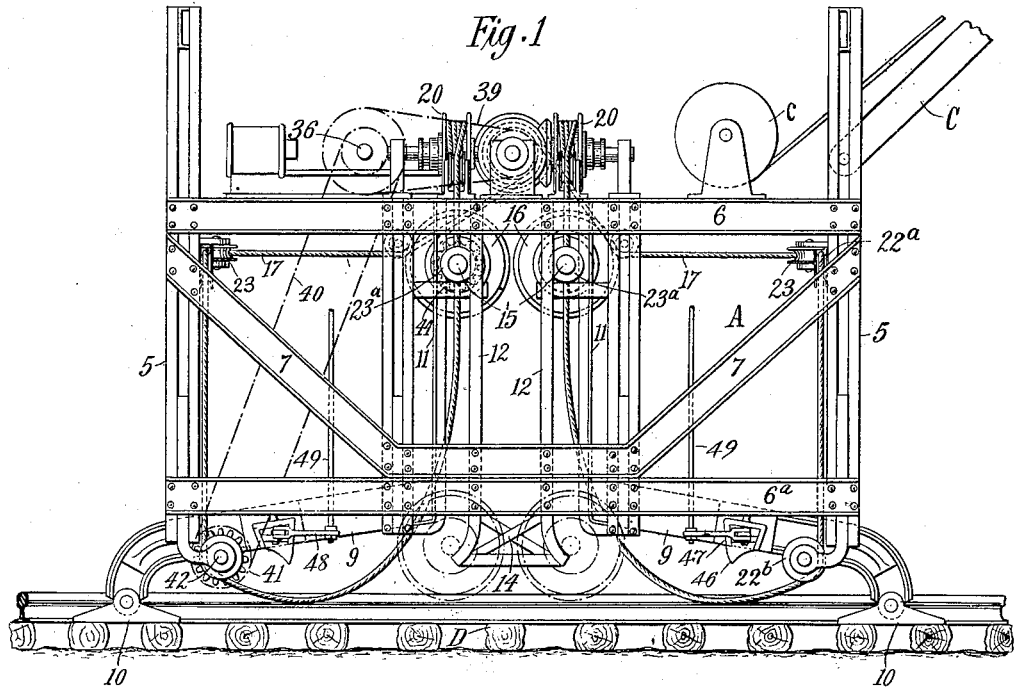

No. 889,934. PATENTED JUNE 9, 1908.
A. W. KURZ.
LOG LOADING APPARATUS.
APPLICATION FILED MAY 25, 1905.

7 SHEETS—SHEET 1.

Witnesses
Raphael Ketter
R. B. Cavanagh

Inventor
August W. Kurz
By his Attorneys

No. 889,934. PATENTED JUNE 9, 1908.
A. W. KURZ.
LOG LOADING APPARATUS.
APPLICATION FILED MAY 25, 1905.
7 SHEETS—SHEET 2.
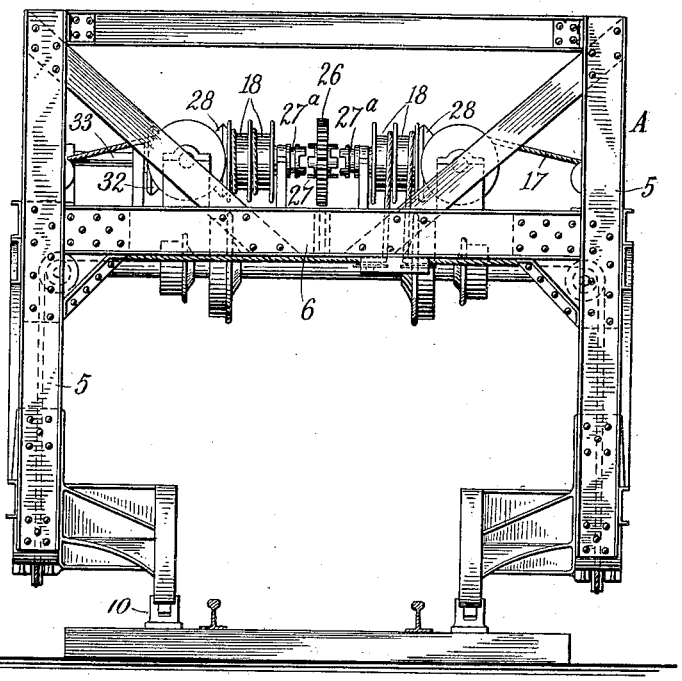
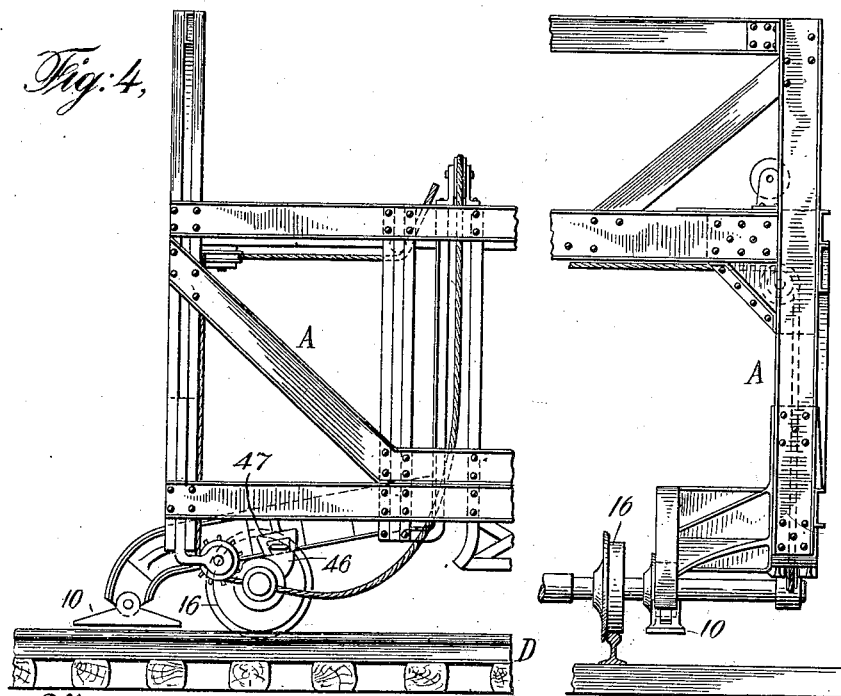

No. 889,934. PATENTED JUNE 9, 1908.
A. W. KURZ.
LOG LOADING APPARATUS.
APPLICATION FILED MAY 25, 1905.
7 SHEETS—SHEET 3.
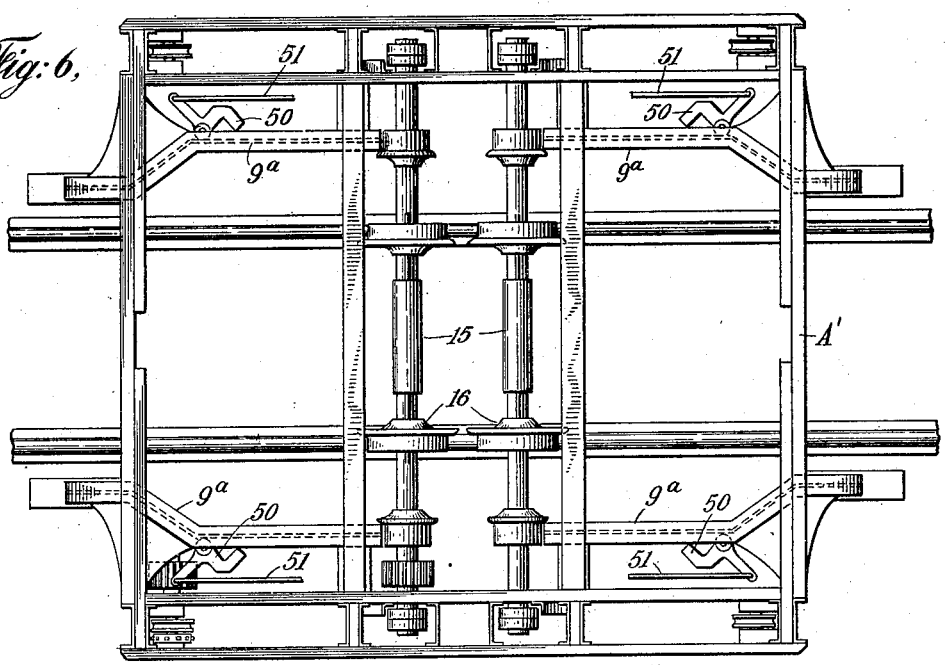
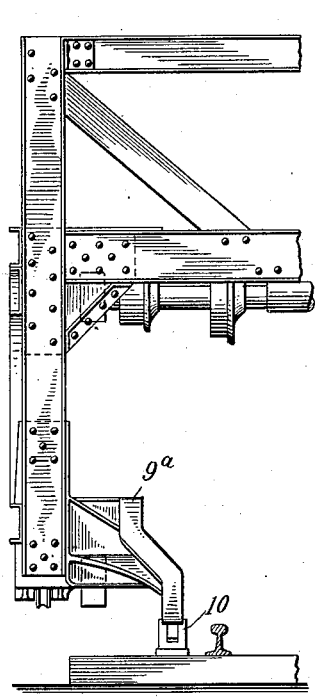
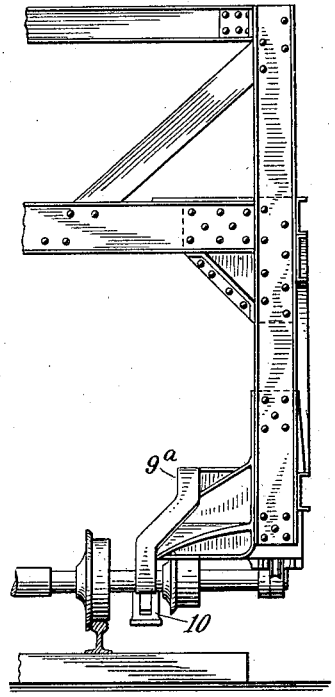

No. 889,934. PATENTED JUNE 9, 1908.
A. W. KURZ.
LOG LOADING APPARATUS.
APPLICATION FILED MAY 25, 1905.

7 SHEETS—SHEET 4.

No. 889,934.

PATENTED JUNE 9, 1908.

A. W. KURZ.
LOG LOADING APPARATUS.
APPLICATION FILED MAY 25, 1905.

7 SHEETS—SHEET 5.

No. 889,934.  
PATENTED JUNE 9, 1908.  
A. W. KURZ.  
LOG LOADING APPARATUS.  
APPLICATION FILED MAY 25, 1905.

7 SHEETS—SHEET 6.

Witnesses  
Raphaël Netter  
R. B. Cavanagh

Inventor  
August W. Kurz  
By his Attorneys Gifford & Bull

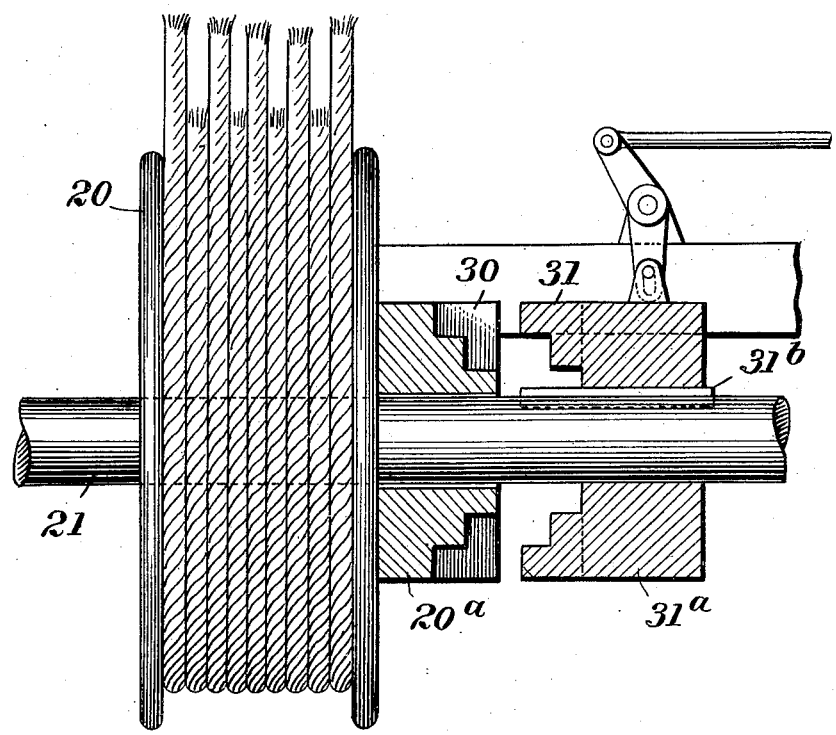
Fig.15.
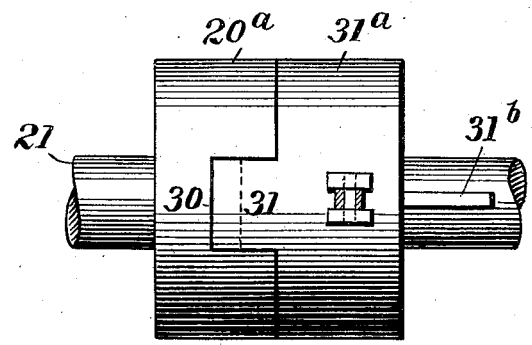

UNITED STATES PATENT OFFICE.

AUGUST W. KURZ, OF CLEVELAND, OHIO.

LOG-LOADING APPARATUS.

No. 889,934.　　　　　Specification of Letters Patent.　　　　Patented June 9, 1908.

Application filed May 25, 1905. Serial No. 262,234.

*To all whom it may concern:*

Be it known that I, AUGUST W. KURZ, a citizen of the United States, and a resident of Cleveland, in the county of Cuyahoga and State of Ohio, have invented certain new and useful Improvements in Log-Loading Apparatus, of which the following is a specification.

The present invention relates to apparatus for loading and unloading cars and the like, and relates more particularly to an apparatus for handling logs.

The invention contemplates the provision in apparatus of the character mentioned of self-contained means for transporting the apparatus from place to place, such transporting means comprising propelling devices which may be shifted into an inoperative position and permit the entire apparatus to rest stationary at the point of use.

The invention also contemplates the provision of an apparatus characterized by simplicity and durability in design and construction, and susceptible of economical and convenient operation.

With these and other ends of a similar nature in view, my invention consists in the features of construction, combination and arrangement of parts set forth in and falling within the scope of the appended claims.

To enable other skilled in the art to understand the construction and use of my invention, I have shown in the accompanying drawings and shall hereinafter describe one typical embodiment of the invention, but I do not limit myself to the details of construction shown in the drawings, as there may be modification and variation in regard to such details and the arrangement and combination of parts without departing from the spirit or exceeding the scope of the invention, and without sacrificing any of the advantages thereof.

Figure 2:
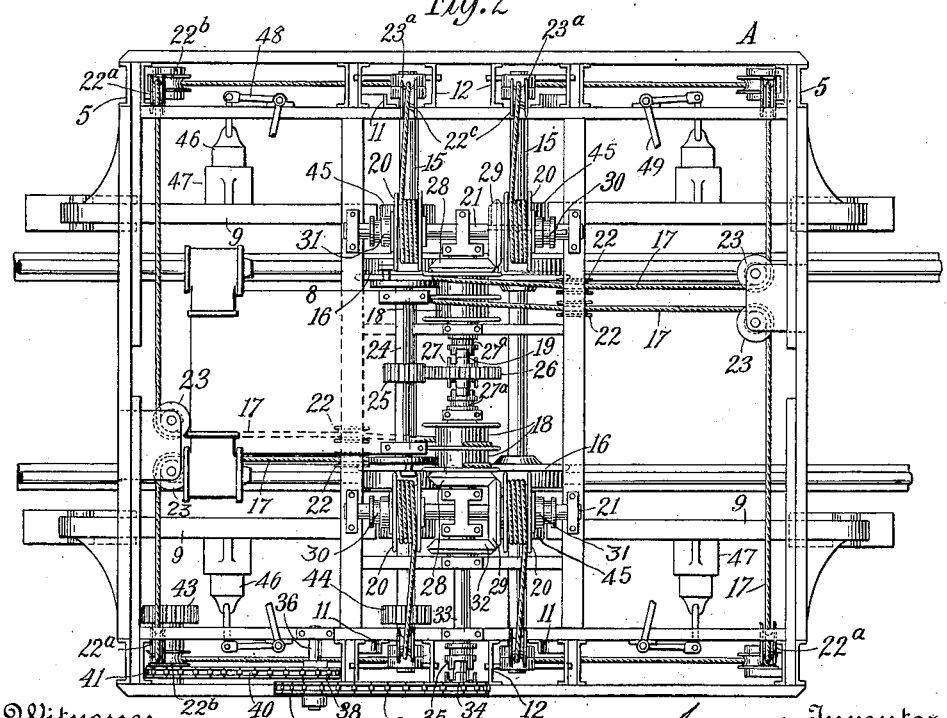
Figure 9:
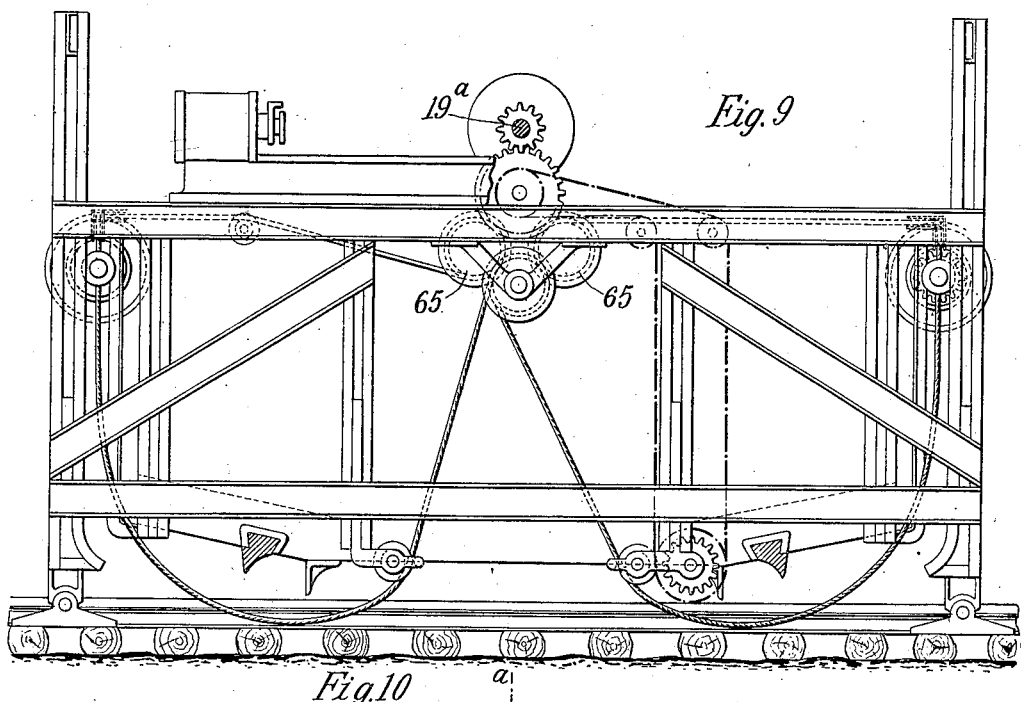
Figure 10:
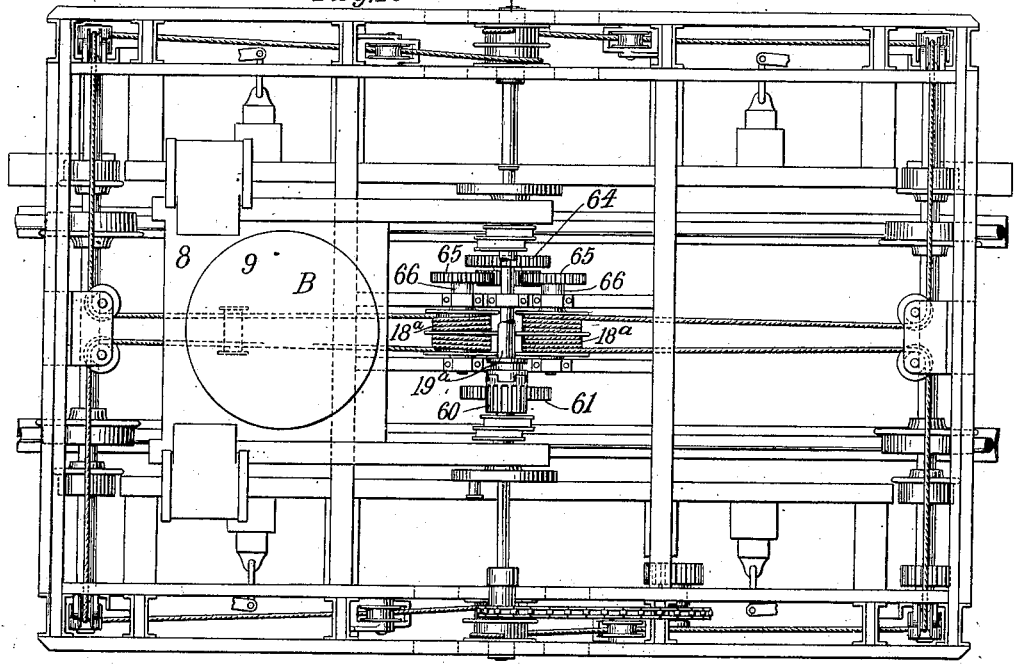
Figure 11:
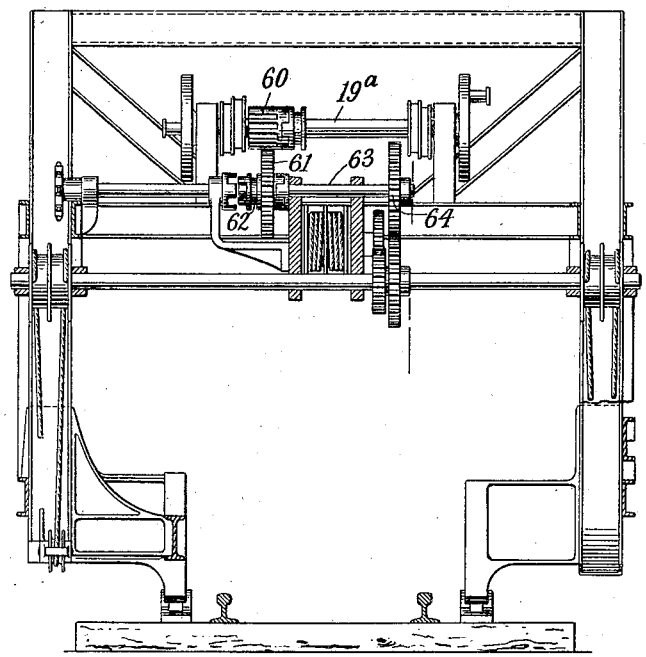
Figure 12:
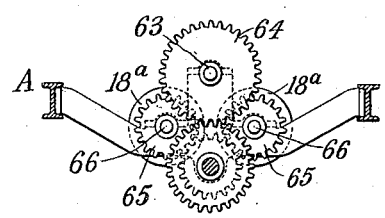
Figure 13:
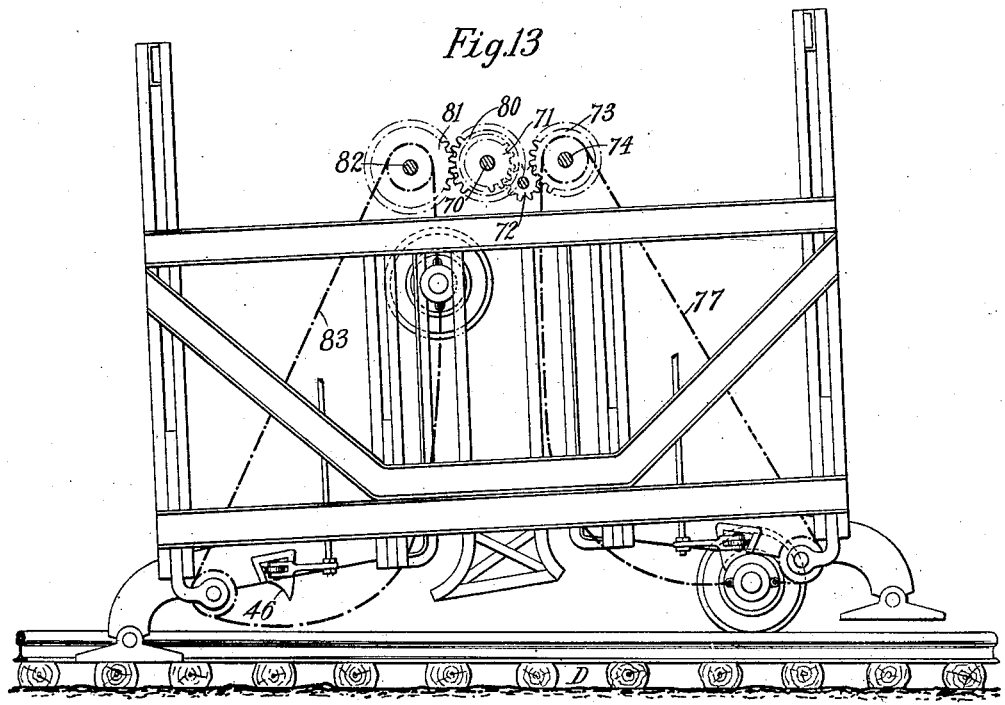
Figure 14:
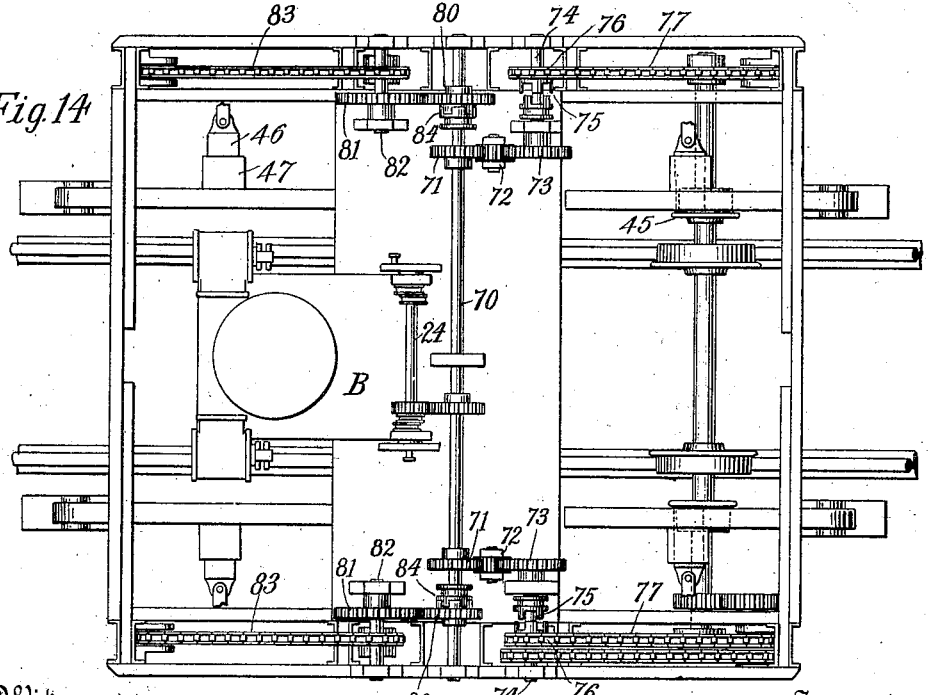

In the accompanying drawing in which similar characters of reference indicate corresponding parts in the several views, Figure 1 is a view in side elevation of a log loading apparatus embodying my improvements; Fig. 2 is a top plan view of the same; Fig. 3 is a view in end elevation; Fig. 4 is a side view of the frame broken away, showing the traction or propelling wheels of the loader in their operative or active position; Fig. 5 is a similar view but taken in end elevation;
Fig. 6 is a top plan view of a modified form of apparatus, certain parts of the operating mechanism being removed from the frame; Fig. 7 is view in end elevation of a portion of a device such as is shown in Fig. 6, the traction wheels being illustrated in their elevated non-active position; Fig. 8 is a view similar to Fig. 7, but showing the traction wheels in their lowered, operative position; Fig. 9 is a view of another form of apparatus wherein the traction wheels, when lowered, are drawn in toward the center of the frame; Fig. 10 is a top plan view of the machine shown in Fig. 9; Fig. 11 is a vertical sectional view taken on the line *a—a* of Fig. 10; Fig. 12 is a detail view of the arrangement of power gearing for transporting motion to the cable winding drum shaft of Fig. 11; Fig. 13 is a view in side elevation showing another modification wherein endless chains are employed for raising and lowering the traction wheels; Fig. 14 is a top plan view of the structure illustrated in Fig. 13; and Fig. 15 is a detail sectional view showing the arrangement of the clutch mechanism for operating the winding drums.

Referring to the drawings by the reference characters marked thereon, the letter A indicates the frame of the apparatus as a whole, such frame comprising vertical standards 5 and horizontal connecting members 6 and 6ª, these frame portions being preferably formed of metal I-beams, channel bars or the like. Strength and rigidity are imparted to the frame by means of brace bars or struts 7, of which any suitable number may be employed. Upon the top of the frame a flooring or platform 8 is provided to afford support for a hoisting engine B of any suitable construction. In the present instance the engine is of the two cylinder reversing type and any inconvenience from the occurrence of dead centers is avoided. At one end of the frame a hoisting beam or derrick C of any suitable construction is provided and at the base of the hoisting beam or derrick C a hoisting reel *c* is mounted. Driving connections of any suitable character may be provided between the engine B and the hoisting reel *c*. At the lower end of the frame there are rigidly secured four inclined supporting members 9, each of which slopes slightly downward from a point near the middle of the frame towards one of the ends thereof, and the lower end of each of the supporting members 9 is bent or extended downward and provided with a shoe 10 adapted to rest on the ties of the track D when the apparatus is stationary and in use. The shoes 10 are preferably pivotally connected with the supporting members 9, as shown.

When the apparatus is in use as a loader or unloader, the entire weight is borne by the shoes 10 which rest upon the ties of the track and the apparatus is, of course, perfectly stationary. When, however, it is desired to transfer the apparatus from one point to another the frame and the parts supported thereby are raised so that the shoes 10 no longer rest upon the ties, but permit the apparatus to be moved freely upon wheels by means of power supplied by the engine B.

Intermediate of the ends of the frame A at each side thereof a pair of vertical guides is provided. Each guide consists preferably of a member 11 and a member 12, the latter being longer than the former and having its lower end curved slightly downward and toward the adjacent end of the frame A. The members 12 of the guides at each side of the frame, are connected at their lower ends by braces 14 so that one member may be combined with the other to form a perfectly still and rigid structure. The shorter guide members 11 are spaced from the longer members 12 sufficient to leave passageways for the axles 15 upon which the flange wheels 16 which bear the weight of the apparatus when being transmitted are splined. The wheels are splined to the axles in order to permit lateral adjustment of the wheels to correspond to tracks of different gage.

When the apparatus is stationary, the axles with the wheels mounted thereon are raised to the position shown in Fig. 1, the weight of the wheels and axles being borne by cables 17, of which four are preferably provided. Each of these cables has one end attached to one pair of reels 18 mounted upon the shaft 19 journaled in bearing brackets upon the top of the frame A. The other ends of the cables 17 are attached to drums or reels 20, loosely mounted upon the shafts 21, which latter extend longitudianally of the frame and transversely of the shaft 19, such shafts being journaled in suitable bearing brackets also mounted upon the top of the frame A. When it is desired to operate the drums 20 they may be shifted into positive engagement with their respective rotating shafts 21 in the manner hereinafter described. From the reels 18 the cables 17 pass downward under suitable guide rollers 22, then toward the ends of the frame and around guide pulleys 23, turning on vertical axes. From the guide pulleys 23 the cables 17 pass laterally over guide pulleys 22ª and thence downward under guide pulleys 22ᵇ, from which they extend upward and toward the middle of the frame to be attached to collars 23ª in which the axles 15 turn. From the collar 23ª the cables 17 pass upward and over guide pulleys 22ᶜ and thence to the drums 20.

The engine of my apparatus is directly connected to the power shaft 24 and, through a drive pinion 25 on this shaft, power is transmitted to the gear wheel 26 carried by the double clutch collar 27 splined on the shaft 19.

27ª, 27ª, are clutch sections, one for each pair of drums 18, such clutch sections being loosely mounted upon the shaft so that they may be shifted into engagement with the side faces of the double clutch 27, as desired. By this arrangement each pair of drums 19 may be operated independently of the other pair, or in unison therewith, and when necessary, such drums may remain stationary and inactive by disconnecting their clutches from the driving clutch. Fast at each end of the shaft 19 is a friction surface bevel gear member 28 meshing with and driving a similar bevel gear 29 fast on the shaft 21, and at right angles to the gear 28, the arrangement being such that the drums 20 may be driven from the shaft 19 when they are connected fast with their respective shafts 21. The manner of connecting the drums 20 in driving engagement with the shaft 21 is shown in detail in Fig. 15. Each of the drums 20 is loosely mounted upon its shaft and provided with a female clutch member 20ª formed with notches or recesses 30 adapted to receive the tongues or projections 31 of the male clutch member 31ª, the latter being splined upon the shaft as at 31ᵇ. By shifting the male member of the clutch longitudinally of the shaft the teeth or projections thereof engage with the recesses of the female member in the usual manner and the wheel 20 is thrown into and out of direct driving engagement with the shaft.

At one side of the machine, the bevel friction gear 29 is in driving connection with a third bevel wheel 32, which latter is fast on one end of the short shaft 33 having its outermost end bearing in the side of the frame.

34 is a sprocket clutch wheel loose on the shaft and adapted to be connected in driving engagement thereto through the sliding clutch member 35, splined to slide along the shaft 33.

36 is a small shaft journaled in the frame and carrying the sprockets 37 and 38. An endless chain 39 connects the sprocket 37 with the sprocket clutch 34, while a similar but vertically inclined endless drive chain 40 connects the sprocket 38 with, and transmits motion to another sprocket wheel 41 mounted on the stub shaft 42, which latter is journaled in suitable bearings on one of the supporting members 9. The stub shaft 42 also has a pinion 43 which is fast thereon and is adapted to mesh with a similar pinion 44, which is rigidly mounted upon the adjacent axle 15. When the axles are drawn into the position shown in Fig. 4, the pinions 43 and 44 mesh, and through them power may be transmitted to one of the wheel axles 15 to transport the apparatus.

As best seen in Fig. 2, the cables 17 are so wound upon the reels 18 and drums 20 that when the engine is operated to wind the cables upon one of the reels 18, the cables will also be wound upon the other reel 18 and the cables will be unwound from the drums 20. As the cables 17 are wound upon the reels 18 and unwound from the drums 20 the axles 15 with the wheels 16 thereon, will be allowed to descend until the wheels engage the rails of the track as indicated in dotted lines in Fig. 1.

The continued winding of the cables 17 upon the reels 18 will take up the slack between the collars 23ª on the axles and the pulleys 22ᵇ and draw the axles toward the ends of the frame A. The axles 15 have rotatably mounted thereon flange rollers 45 which are so positioned that they are adapted to engage with the under surfaces of the supporting members 9 as the axles are drawn toward the ends of the frame A by the cables 17. The initial movement of the axles toward the ends of the frame is insured by the curved, lower ends of the guide members 12. As the axles are drawn toward the ends of the frame by the cables 17, the flanged rollers 45 turn on the axles and act against the inclined, under surface of the supporting members 9 to raise the entire frame of the apparatus, leaving the shoes 10 out of contact with the ties and leaving the apparatus free to travel over the track upon the wheels 16.

When the axles have been drawn toward the ends of the frame A, as desired, and as best shown in Fig. 4, they are secured in that position by means of chocking blocks 46, which are slidably mounted in suitable guides 47 carried by supporting members 9. Chocking blocks are thrown into operative position by means of suitable actuating mechanism, such as the arms 48 at the lower ends of the vertical rock shaft 49. The chocking blocks 46 engage with the surface of the flanged rollers 45 and positively prevent any bodily movement of the axles toward the middle of the frame, and they also permit the strain on the cables 17 to be relaxed so that the power of the engine may be employed to impart power to one pair of the wheels.

When the apparatus is being transported it is necessary that the winding reels and drums be disconnected from the engine, and to accomplish this, the clutch members 27ª are moved out of engagement with the gear clutch 26, and the drums 20 are also disconnected from the shafts 21 by disengaging the clutches connecting them to such shafts. By throwing the clutch member 35 into engagement with the sprocket clutch 34 motion may be transmitted from the shaft 19 through the bevel gears 28, 29 and 32, and the shaft 33 to the drive chains 39 and 40, and thence to the wheels, as heretofore described.

After the transportation of the apparatus, when it is desired to raise the wheels to the position shown in solid lines in Fig. 1, and allow the shoes 10 to engage the ties of the track D, the series of operations by which the wheels are brought into position shown in Fig. 4, is reversed. That is to say, the clutch 35 is released, the clutches 27, 27ª are locked to bring the reels 18 into action and the blocks 46 are withdrawn. The engine is then reversed and the cables wound on the reels 18 are allowed to unwind while they are being wound upon the drums 20, which latter, by means of their clutches, have been connected with the shafts 21. As the axles pass from the position shown in Fig. 4 to the position shown in dotted lines in Fig. 1, the power of the engine is not required to effect the movement of the axles and wheels, but to release that movement in order to prevent the apparatus from being allowed to drop suddenly and violently downward to bring the shoes 10 into engagement with the ties of the track D, but after the wheels and axles reach the dotted line position shown in Fig. 1, the power of the engine is required to effect the winding of the cables upon the drums 20, which is necessary to raise the wheels and axles to the position shown in dotted lines in Fig. 1. After the wheels and axles have been raised to the full limit permitted by the guides provided on the frame, they can be secured thereto by any suitable devices for that purpose, thus leaving sufficient space beneath the wheels, as best seen in Fig. 3, to permit a car to pass along the track beneath the frame.

As the operation of the apparatus in loading or unloading logs from cars, or the like, is precisely similar to the operation of other forms of apparatus for the same purpose, and has no bearing upon the present invention, it is deemed unnecessary to describe that operation in this specification.

In Figs. 6, 7 and 8 I have illustrated the frame and some of the other parts of the apparatus differing slightly from that above described. In the apparatus illustrated in these figures, the frame A is similar in construction to that shown in the preceding figures, but the supporting members 9ª are slightly different in form from the supporting members 9 above described. The supporting members 9ª have the lower ends thereof bent inward toward the rails of the track while the main portions of said supporting members lie parallel to the track but are placed nearer to the side members of the frame A. The object of this construction is to permit a greater range of adjustment of the wheels 16 upon the axles 15 than is possible in the form of the invention, which was first described and to insure the engagement of the shoes 10 carried by the members 9ª with the ties upon which the track rails are secured, even when such tires are very short. In Fig. 6, there is also shown a set of locking devices for the axles which differ somewhat from the chocking blocks already described. These locking devices consist of dogs 50 pivotally mounted upon the supporting members 9ª and provided with suitable operating rods 51 by means of which the dogs can be thrust into and out of locking position. In other respects, the apparatus to be mounted upon the frame shown in Figs. 6, 7 and 8 is identical with that already described and shown, and no further description thereof is necessary.

In Figs. 9, 10 and 11 I have shown still another modification of the invention, differing in this respect from that previously described in detail, in that the traction wheels instead of being drawn outward away from the center of the frame by the operating cables, are mounted in guideways near the extreme ends of the frame, and, when the power mechanism is operated, such wheels are drawn downward and then inward toward the center of the frame. Referring now to said Figs. 9, 10 and 11, the engine B is connected in driving engagement with the power shaft 19ª, which shaft carries the pinion clutch 60 adapted to mesh and drive a gear wheel 61 of the clutch member 62 connected with the small shaft 63. This latter shaft has fast at one end thereof the drive pinion 64 designed to mesh with the gear wheels 65, 65, fast with the shafts of the winding drums 18ª. The wheels of the apparatus, as will be clearly seen in the said figures, are mounted in guides at the end of the frame, and when the engine is operated to draw the wheels in their lowered position, the cables being wound upon the drum 18ª, 18ª, draw such wheels downward and in toward the center of the frame where they may be locked and power transmitted thereto, substantially as heretofore described.

In Figs. 13 and 14 I have shown still another arrangement of the apparatus in which the counter shaft 70 receiving motion from the engine B is provided with driving pinions 71, 71, near the ends thereof. These pinions through the intermediate small pinions 72 transmit the power of the shaft to the gear wheels 73 of the small sprocket shafts 74. Through said shafts, when the clutches 75 are properly set, power may be transmitted to the sprocket members 76 and thence to the endless drive chains 77, which are connected with the wheels of the apparatus. The counter shaft 70 is also provided with clutch gears 80, transmitting motion to the gear wheels 81 on the stub shafts 82, whereby power may be also applied to the endless drive chains 83 of the other set of wheels, when the clutch members 84 are properly set. The operation of this apparatus is substantially the same as that heretofore described for the other arrangements shown.

From the foregoing description and the drawings illustrative thereof, it will be seen that the apparatus forming the present invention is simple in construction and adapted for easy and economical operation. The fixed supporting devices upon which the frame rests when the apparatus is in use, are of very strong and rigid design, and the wheels and axles by which the apparatus is supported when in process of transportation, are raised and secured so as to be entirely out of the way of cars passing under the apparatus when it is in use. When, however, the frame is raised and the apparatus is supported upon its wheels, the axles are effectively held by locking devices engaging the rollers carried by the axles and so relieve the cables by which the wheels and axles are shifted of all strain.

After transportation of the apparatus, when it is desired to bring the shoes at the end of the fixed supporting members into engagement with the ties on the track, the release of the wheels and axles from the locking devices by which they are secured during the transportation of the apparatus, is very easily effected and the wheels and axles returned without the expenditure of any power to the lower end of the guides in which they are raised, to leave the space between the frame free for the passage of cars.

Having thus described my invention, what I claim is:

1. In loading apparatus, the combination of a frame for supporting hoisting mechanism, means for forming a fixed support for said frame, wheels for rendering such frame movable upon a track and means for drawing said wheels upward between the ends of said frame and for lowering said wheels and drawing the same beneath the fixed supports.

2. In a loading apparatus, the combination of a frame for carrying hoisting mechanism, means for forming a fixed support for said frame, devices for rendering such frame movable upon a track and means coöperating with said devices whereby the bodily movement of said devices toward the ends of the frame will raise the fixed support into inoperative position.

3. In loading apparatus, a frame, hoisting mechanism carried thereby, fixed supporting means secured to the frame and adapted to normally form a fixed support for the apparatus, and traction devices adapted to be raised to an inoperative position within the frame and to be lowered and moved into position beneath the fixed support to raise the apparatus and permit it to be moved upon a track.

4. In loading apparatus, the combination of a frame for carrying hoisting mechanism, fixed supporting members secured to said frame and adapted normally to form a fixed support for the apparatus, wheels for rendering the apparatus movable upon a track and means adjacent to said wheels and adapted to engage said supporting members when the wheels are drawn into operative position to raise the apparatus and render it movable.

5. In hoisting apparatus, the combination of a frame adapted to span a track and provided with fixed supporting members, wheels for rendering the apparatus movable upon a track, axles upon which said wheels are secured, means for shifting said axles bodily with said wheels engaging the track and members engaged by said axles during said shifting, whereby the frame is raised and rendered movable.

6. In loading apparatus, the combination of a frame adapted to span a track and provided with fixed supporting members, wheels for rendering the apparatus movable upon the track, axles upon which said wheels are fast, rollers upon said axles, means for shifting said axles bodily with said wheels engaging the track and inclines engaged by said rollers during the shifting of said axles, whereby said frame is raised and the apparatus rendered movable.

7. In loading apparatus, the combination of a frame adapted to span a track and provided with means for forming a fixed support, substantially vertical guides between the ends of said frame, inclines extending from the lower ends of said guides toward the ends of the frame, wheels for rendering the apparatus movable upon a track, axles upon which said wheels are mounted, said axles being adapted to travel in said guides and means for raising and lowering said axles in said guides and drawing said axles toward the ends of the frame beneath said inclines, whereby the frame is raised and the apparatus rendered movable on the track.

8. In loading apparatus, the combination of a frame adapted to span a track and provided with means for forming a fixed support, wheels for rendering the frame movable upon a track, axles upon which said wheels are mounted, means for raising said axles vertically to lift the wheels on the track and means for moving said axles bodily while the wheels engage the track to raise said frame and render the apparatus movable.

9. In loading apparatus, the combination with a frame adapted to span a track and provided with supporting members, wheels adapted to engage the track to render the apparatus movable, axles upon which said wheels are mounted, means comprising cables, winding devices and guides for moving said axles, inclines engaged by said axles to raise the frame and means independent of the winding devices for locking the axles in position to keep the frame in elevated position.

10. In loading apparatus, a frame adapted to span a track, means for forming a fixed support for said frame, wheels for rendering said frame movable on a track, said wheels being normally raised out of engagement with the track, means for bringing said wheels downward into engagement with the track and beneath the fixed support and raising the frame to render the apparatus movable and means provided on the frame for driving one or more of said wheels.

11. In loading apparatus, the combination with a frame adapted to span a track and provided with means for forming a fixed support for said frame, of wheels for rendering the apparatus movable on a track, means for withdrawing said wheels from beneath the support and elevating the same axles upon which said wheels are adjustable to correspond with tracks of different widths, means for bringing said wheels into engagement with the track and beneath the fixed support for raising said frame to render it movable and means for imparting power to said wheels.

12. In loading apparatus, the combination of a frame adapted to span a track and provided with means for forming a fixed support for the frame, of wheels for rendering the apparatus movable upon the track, axles for said wheels, means for bringing said wheels into engagement with the track and raising said frame after said wheels engage the track, an engine carried by the frame and power transmitting connections comprising pinions which mesh when the axles are in the position reached when the frame is raised ready for transportation and which become disengaged when the axles are shifted to hold the frame raised on its fixed support.

AUGUST W. KURZ.

Witnesses:
RICHARD B. CAVANAGH,
JOS. J. PIERANDO.